United States Patent
Savir et al.

(10) Patent No.: US 11,023,420 B1
(45) Date of Patent: *Jun. 1, 2021

(54) REAL-TIME COMPRESSION OF LOG DATA

(71) Applicant: EMC IP Holding Company LLC, Hopkinton, MA (US)

(72) Inventors: Amihai Savir, Sansana (IL); Oshry Ben-Harush, Kibutz Galon (IL); Omer Sagi, Mazkeret Batya (IL)

(73) Assignee: EMC IP Holding Company LLC, Hopkinton, MA (US)

( * ) Notice: Subject to any disclaimer, the term of this patent is extended or adjusted under 35 U.S.C. 154(b) by 214 days.

This patent is subject to a terminal disclaimer.

(21) Appl. No.: 15/940,247

(22) Filed: Mar. 29, 2018

(51) Int. Cl.
*G06F 16/174* (2019.01)
*G06F 16/13* (2019.01)

(52) U.S. Cl.
CPC .......... *G06F 16/1744* (2019.01); *G06F 16/13* (2019.01)

(58) Field of Classification Search
None
See application file for complete search history.

(56) References Cited

U.S. PATENT DOCUMENTS

| | | | |
|---|---|---|---|
| 9,617,478 B2 | 4/2017 | Livneh | |
| 2011/0035390 A1* | 2/2011 | Whitehouse | ........ H04L 63/1425 707/755 |
| 2014/0317137 A1* | 10/2014 | Hanaoka | ................. G06F 17/40 707/758 |
| 2016/0197621 A1* | 7/2016 | Hong | ................. H03M 7/6005 715/236 |
| 2017/0075932 A1* | 3/2017 | Wang | ................. G06F 16/2379 |
| 2018/0101423 A1* | 4/2018 | Yoon | ..................... G06F 11/323 |
| 2019/0089371 A1* | 3/2019 | Ozaki | ..................... G06F 11/34 |

* cited by examiner

*Primary Examiner* — Mark D Featherstone
*Assistant Examiner* — Samuel C Sharpless, III
(74) *Attorney, Agent, or Firm* — Ryan, Mason & Lewis, LLP

(57) ABSTRACT

Techniques are provided for compression and decompression of log data. An exemplary method comprises: obtaining a log message, wherein the log message comprises a message template and one or more message variables; obtaining a compression index that maps a plurality of message templates to a corresponding message signature; and writing the one or more message variables and a message signature corresponding to the message template of the log message to a log file. A counter may be maintained for each of a plurality of distinct message templates, and a given message signature may be assigned to a particular message template based on a length of the given message signature and a frequency of occurrence of the particular message template. The compression index comprises, for example, a key/value database where the message templates are keys and the corresponding message signatures are values of the key/value database. A decompression index maps message signatures to corresponding message templates.

20 Claims, 10 Drawing Sheets

WRITE-TO-FILE METHOD 600

IF MESSAGE TEMPLATE 210 IS NOT A KEY IN COMPRESSION INDEX 700:
ADD KEY = "MESSAGE TEMPLATE" AND VALUE = "MESSAGE SIGNATURE" TO COMPRESSION INDEX 700;
ADD KEY = "MESSAGE SIGNATURE" AND VALUE = "MESSAGE TEMPLATE" TO DECOMPRESSION INDEX 800;
ADD KEY = "MESSAGE TEMPLATE" AND VALUE = 0 TO STATISTICS DATABASE 950 (E.G., INITIALIZE A NEW COUNTER)

ELSE:
WRITE "MESSAGE SIGNATURE" AND VARIABLES OF MESSAGE INTO LOG FILE; INCREASE COUNTER THAT MAPPED TO "MESSAGE TEMPLATE" IN STATISTICS DATABASE 950

FIG. 6

COMPRESSION INDEX 700

| TEMPLATE (KEY) | SIGNATURE |
|---|---|
| "text-1,1 %d text-2,1 %s, text-3,1 %..., text-n" | 01x |
| "text-1 %d text-2 %s, text-3 %..., text-n" | 02x |
| "text-1,3 %d text-2,3 %s, text-3,3 %..., text-n" | 03x |
| "text-1,k %d text-2,k %s, text-3,k %..., text-n" | FAx |

FIG. 7

DECOMPRESSION (REVERSE) INDEX 800

| SIGNATURE (KEY) | TEMPLATE |
|---|---|
| 01x | "text-1,1 %d text-2,1%s, text-3,1 %..., text-n" |
| 02x | "text-1 %d text-2 %s, text-3 %..., text-n" |
| 03x | "text-1,3 %d text-2,3 %s, text-3,3 %..., text-n" |
| FAx | "text-1,k %d text-2,k %s, text-3,k %..., text-n" |

FIG. 8

REAL-TIME COMPRESSION OF LOG DATA

FIELD

The field relates generally to the processing of log messages.

BACKGROUND

Traditional log file systems typically store all of the log data generated by a monitored system, such as software and/or hardware applications. Log files often contain uninformative information that reappears in multiple log messages due to redundant text that a given log message template contains. Such uninformative information is stored in the log file system, consuming storage resources and causing challenges for data analysis tasks.

A need therefore exists for techniques for reducing log file system size and for easing log data analysis tasks. A further need exists for techniques for compression and decompression of log messages.

SUMMARY

Illustrative embodiments of the present disclosure provide for compression and decompression of log data, such as a real-time compression and decompression of log data. In one embodiment, an exemplary method comprises: obtaining at least one log message, wherein the at least one log message comprises a message template and one or more message variables; obtaining a compression index that maps a plurality of message templates to a corresponding message signature; and writing the one or more message variables and a message signature corresponding to the message template of the at least one log message to a log file.

In some embodiments, a counter is maintained for each of a plurality of distinct message templates, and a given message signature is assigned to a particular message template based on a length of the given message signature and a frequency of occurrence of the particular message template.

In at least one embodiment, the compression index comprises a key/value database where the plurality of message templates are keys and the corresponding message signatures are values of the key/value database, and a decompression index comprises a key/value database that maps a plurality of message signatures to corresponding message templates.

Other illustrative embodiments include, without limitation, apparatus, systems, methods and computer program products comprising processor-readable storage media.

BRIEF DESCRIPTION OF THE DRAWINGS

FIG. 6 illustrates exemplary pseudo code for a write-to-file method, according to an embodiment of the disclosure;

FIG. 7 is a table illustrating an exemplary compression index that may be used by the exemplary log message compression module of FIG. 5, according to one embodiment;

FIG. 8 is a table illustrating an exemplary decompression index that may be used by the exemplary log message compression module of FIG. 5, according to an embodiment;

DETAILED DESCRIPTION

Illustrative embodiments of the present disclosure will be described herein with reference to exemplary communication, storage and processing devices. It is to be appreciated, however, that the disclosure is not restricted to use with the particular illustrative configurations shown. One or more embodiments of the disclosure provide for compression and decompression of log data.

In one or more embodiments, log messages are compressed by storing portions of log messages that reappear in other log messages only once and representing the reappearing portions (referred to herein as a message template) using a short sequence of characters (referred to herein as a signature). In some embodiments, the length of the sequence is determined by a number of occurrences of the given text. Generally, a given message signature is assigned to a particular message template based on a length of the given message signature and a frequency of occurrence of the particular message template (e.g., the more frequent the occurrences, the shorter the sequence length of the signature). The disclosed log message reduction techniques significantly reduce the size of the log files and simplify log analysis tasks in a fully automated manner. One or more aspects of the disclosure recognize that traditional log file systems store the entire log message generated by the monitored systems (e.g., software and/or hardware applications) regardless of the constant text (template) of the log messages.

Quality Assurance and software engineers spend a substantial amount of time analyzing complex log files. Their goal is usually to gain a better understanding of the set of events that led to a specific outcome. In most cases, this is a tedious task that requires reviewing numerous textual messages. While some of those messages are highly informative, other messages (or large portions thereof) can have no additive value, since such messages are always coupled with fixed text that appears before and after the real information that they try to express; for machine learning and natural language processing methods such messages do not contribute any significant information.

Event logs are stored by default as plain text on some local and/or remote servers. Having a substantial amount of reoccurring text sequences increases the consumption of storage resources and therefore, increases costs for log data owners. This problem becomes even more challenging when a regulation or law is in place and the companies have challenges storing data for a specified time period.

Figure 1:
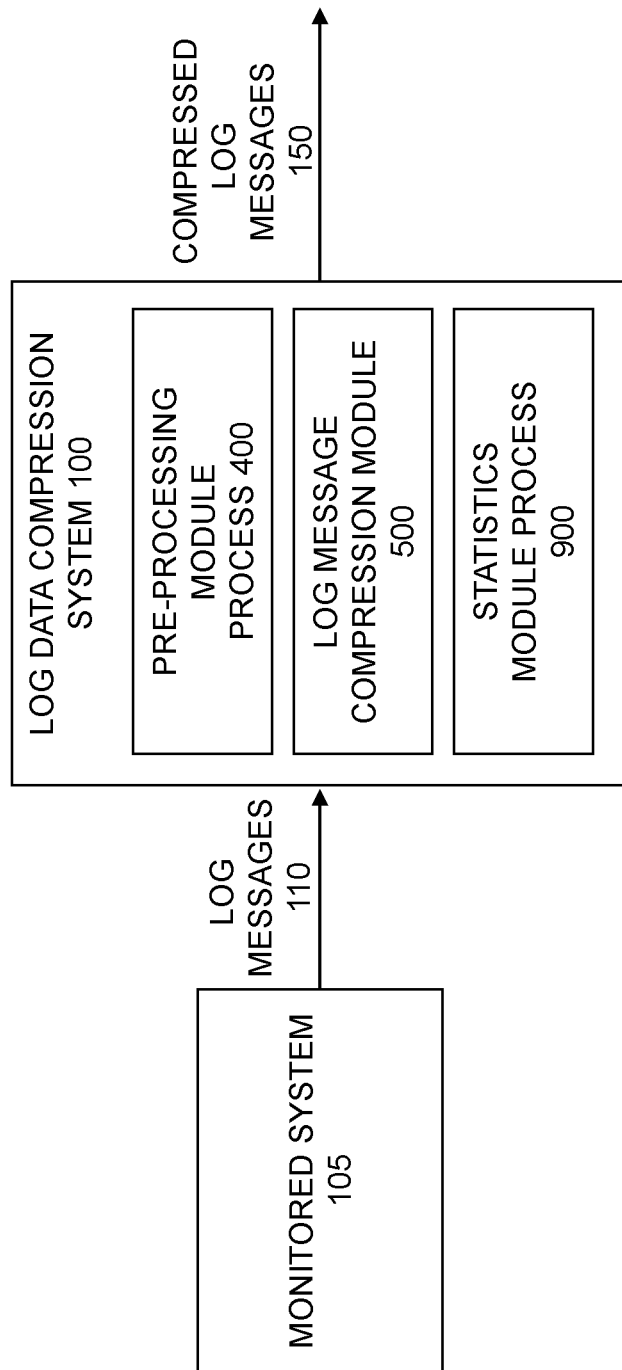
FIG. 1 illustrates an exemplary log data compression system, according to an embodiment of the disclosure.

FIG. 1 illustrates an exemplary log data compression system 100, according to an embodiment of the disclosure. As shown in FIG. 1, the exemplary log data compression system 100 processes log messages 110 from a monitored system 105, such as a software and/or hardware application, and generates a set of compressed log messages 150. Generally, log messages are compressed by storing message template portions of log messages that reappear in other log messages only once and representing the message template using a short signature sequence of characters, as discussed further below in conjunction with FIG. 2.

The exemplary log data compression system 100 comprises a pre-processing module process 400, as discussed further below in conjunction with FIG. 4, a log message compression module 500, as discussed further below in conjunction with FIG. 5, and a statistics module process 900, as discussed further below in conjunction with FIG. 9A.

Generally, the pre-processing module process 400 analyzes the source code of the logging system and generates a basic mapping from each logger.write( ) call (such as the log command 200 of FIG. 2) to a short signature sequence of characters. The exemplary write-to-file method 600, as discussed further below in conjunction with FIG. 6, implements the log message reduction techniques disclosed herein, using a compression index discussed further below in conjunction with FIG. 7, while maintaining a statistics database discussed further below in conjunction with FIG. 9A. Generally, the statistics database is used by the statistics module process 900 (FIG. 9A) to assign message signatures to particular message templates based on a length of the given message signature and a frequency of occurrence of the particular message template.

Figure 2:
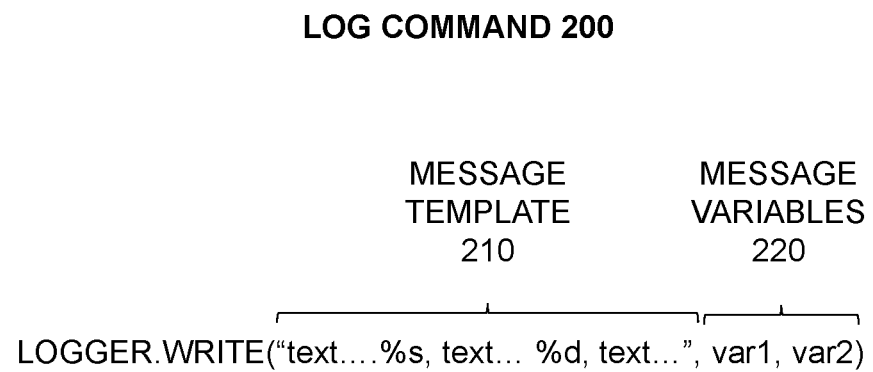
FIG. 2 provides an example of a log command, according to some embodiments.

FIG. 2 provides an example of a log command 200, according to some embodiments. As shown in FIG. 2, the exemplary log command 200 comprises a message template 210 of "text . . . % s, text . . . % d, text . . . " and one or more message variables 220 "var1, var2". Generally, portions of the message template 210 are replaced with the message variables 220, in a known manner. For example, the characters "% d" in the message template 210 (between constant text "text-1" and "text-2") are replaced by the first message variable 220 ("var1").

Figure 3:
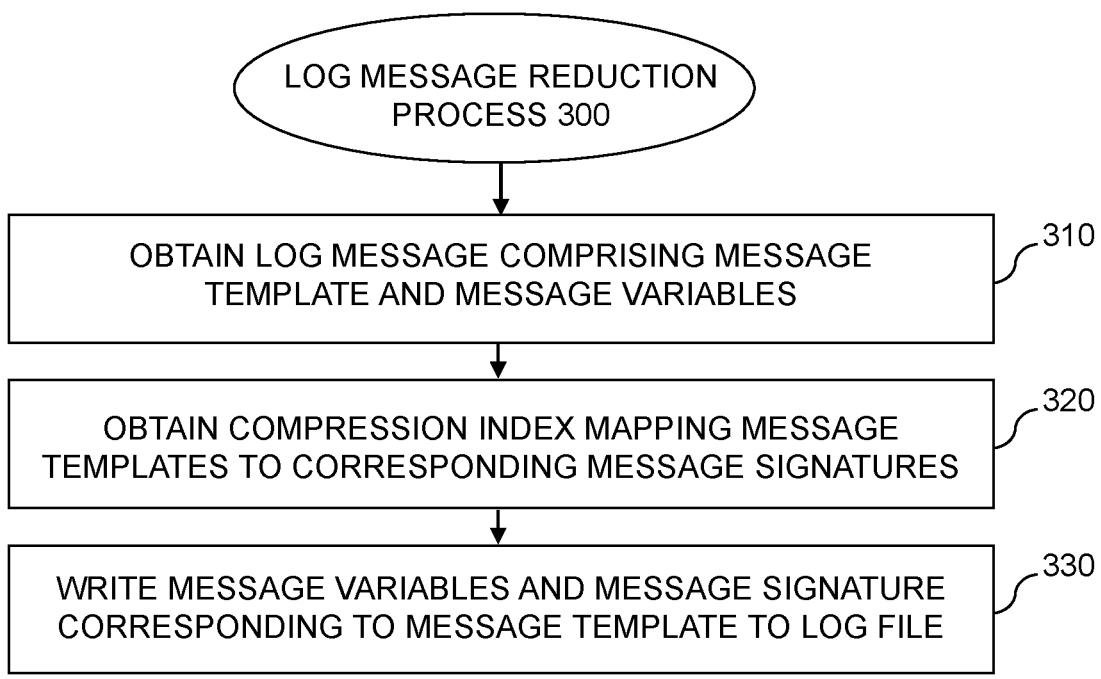
FIG. 3 is a flow chart illustrating a log message reduction process, according to an embodiment.

FIG. 3 is a flow chart illustrating a log message reduction process 300, according to an embodiment of the disclosure. As shown in FIG. 3, the exemplary log message reduction process 300 initially obtains a log message during step 310 comprising a message template and one or more message variables. In addition, the exemplary log message reduction process 300 obtains a compression index during step 320 that maps message templates to corresponding message signatures, as discussed further below in conjunction with FIG. 7. Finally, the log data compression system 100 writes the message variables from the log message and the message signature from the compression index that corresponds to the message template of the log message during step 330 to a log file.

Figure 4:
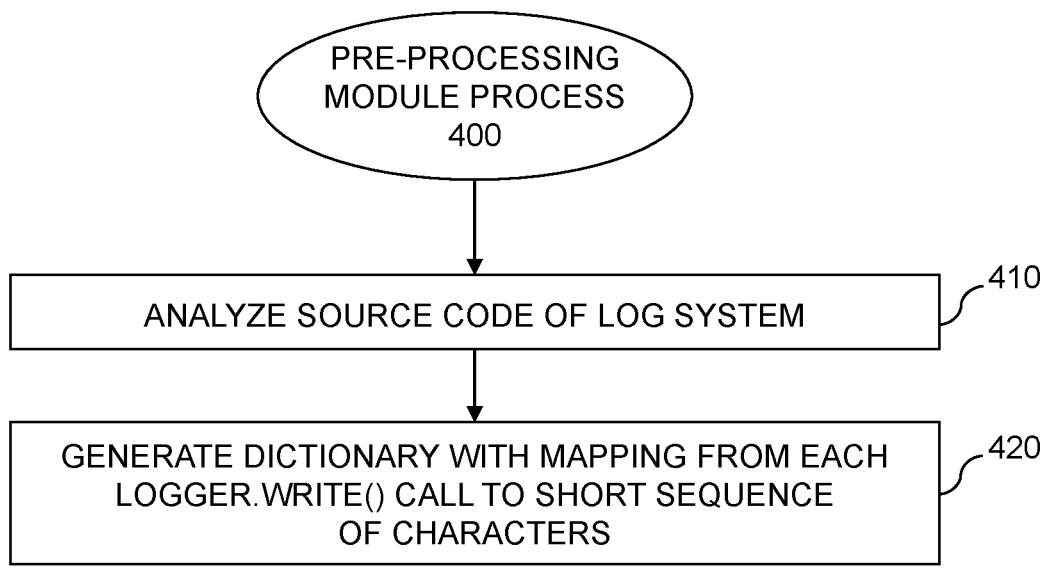
FIG. 4 is a flow chart illustrating the pre-processing module process of FIG. 1 in further detail, according to some embodiments.

FIG. 4 is a flow chart illustrating the pre-processing module process 400 of FIG. 1 in further detail, according to some embodiments. Generally, the pre-processing module process 400 analyzes the source code of the logging system and generates a basic mapping from each logger.write( ) call (such as the log command 200 of FIG. 2) to a short signature sequence of characters.

As shown in FIG. 4, the exemplary pre-processing module process 400 initially analyzes the source code of the monitored system 105 during step 410, and generates a dictionary during step 420 with a mapping of the template 210 from each logger.write( ) call (e.g., the log command 200 of FIG. 2) to a short sequence of characters, in order to create the compression index 700 (FIG. 7).

Figure 5:
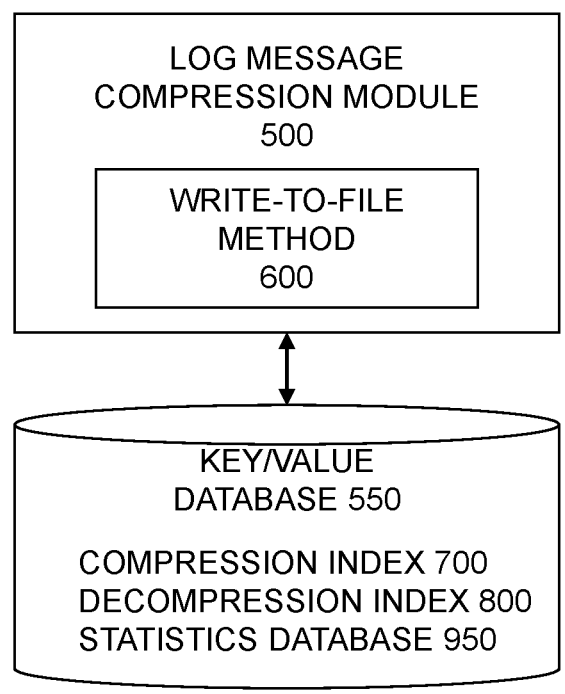
FIG. 5 illustrates the log message compression module of FIG. 1 in further detail, according to at least one embodiment of the disclosure.

FIG. 5 illustrates the log message compression module 500 of FIG. 1 in further detail, according to at least one embodiment of the disclosure. As shown in FIG. 5, the exemplary log message compression module 500 comprises the write-to-file method 600, as discussed further below in conjunction with FIG. 6. Generally, the write-to-file method 600 implements the log message reduction techniques disclosed herein, using the compression index 700 (FIG. 7), while maintaining the statistics database 950 (FIG. 9B). The decompression index 800 (FIG. 8) is used to decompress compressed log messages 150 to restore the original log messages 110.

The compression index 700, decompression index 800, and statistics database 950 are optionally stored in a key/value database 550. In the exemplary compression index 700, the keys correspond to message templates; and the values correspond to message signatures. In the exemplary decompression index 800, the keys correspond to message signatures; and the values correspond to message templates (e.g., providing a reverse index). In the exemplary statistics database 950, the keys correspond to message templates; and the values correspond to an occurrences counter (for statistics).

FIG. 6 illustrates exemplary pseudo code for a write-to-file method 600, according to an embodiment of the disclosure. Generally, the write-to-file method 600 is called each time the code runs a logger.write( ) command (such as the log command 200 of FIG. 2), and the write-to-file method 600 replaces the constant text (template) of the log message with the mapped character sequence (e.g., the message signature), and then writes the message signature and the variables from the logger.write( ) command.

As shown in FIG. 6, the exemplary write-to-file method 600 is applied to a log message 110 having a "message template" and a "message signature." If a message template 210 portion of the log message 110 is not a key in the compression index 700, then a key of "message template" and a value of "message signature" are added to the compression index 700; a key of "message signature" and a value of "message template" are added to the decompression index 800; and a key of "message template" and a value of 0 are added to the statistics database 950 (e.g., to initialize a new counter). Otherwise, the "message signature" and the variables of the log message 110 are written into the log file, and the counter in statistics database 950 is increased that mapped to this "message template."

For example, for the exemplary logger.write( ) command ("logger.write("text . . . % s, text . . . % d, text . . . ", var1, var2)"), the write-to-file method 600 will write the following line into the log file: #A0 var1 var2 (e.g., the template "text . . . % s, text . . . % d, text . . . " is changed to the signature #A0); and will increase the counter that mapped to the message template in the statistics database 950.

FIG. 7 is a table illustrating an exemplary compression index 700 that may be used by the exemplary log message compression module 500 of FIG. 5, according to one embodiment. As shown in FIG. 7, in the exemplary compression index 700, the keys correspond to message templates; and the values correspond to message signatures. For example, the exemplary compression index 700 maps the template "text-1,3% d text-2,3% s, text-3,3% . . . , text-n" to a signature of "03x".

FIG. 8 is a table illustrating an exemplary decompression index 800 that may be used by the exemplary log message compression module 500 of FIG. 5, according to an embodiment. As shown in FIG. 8, in the exemplary decompression index 800, the keys correspond to message signatures; and the values correspond to message templates (e.g., providing a reverse index). For example, the exemplary decompression index 800 (reverse index) maps the signature of "03x" back to a template of "text-1,3% d text-2,3% s, text-3,3% . . . , text-n."

Figure 9:
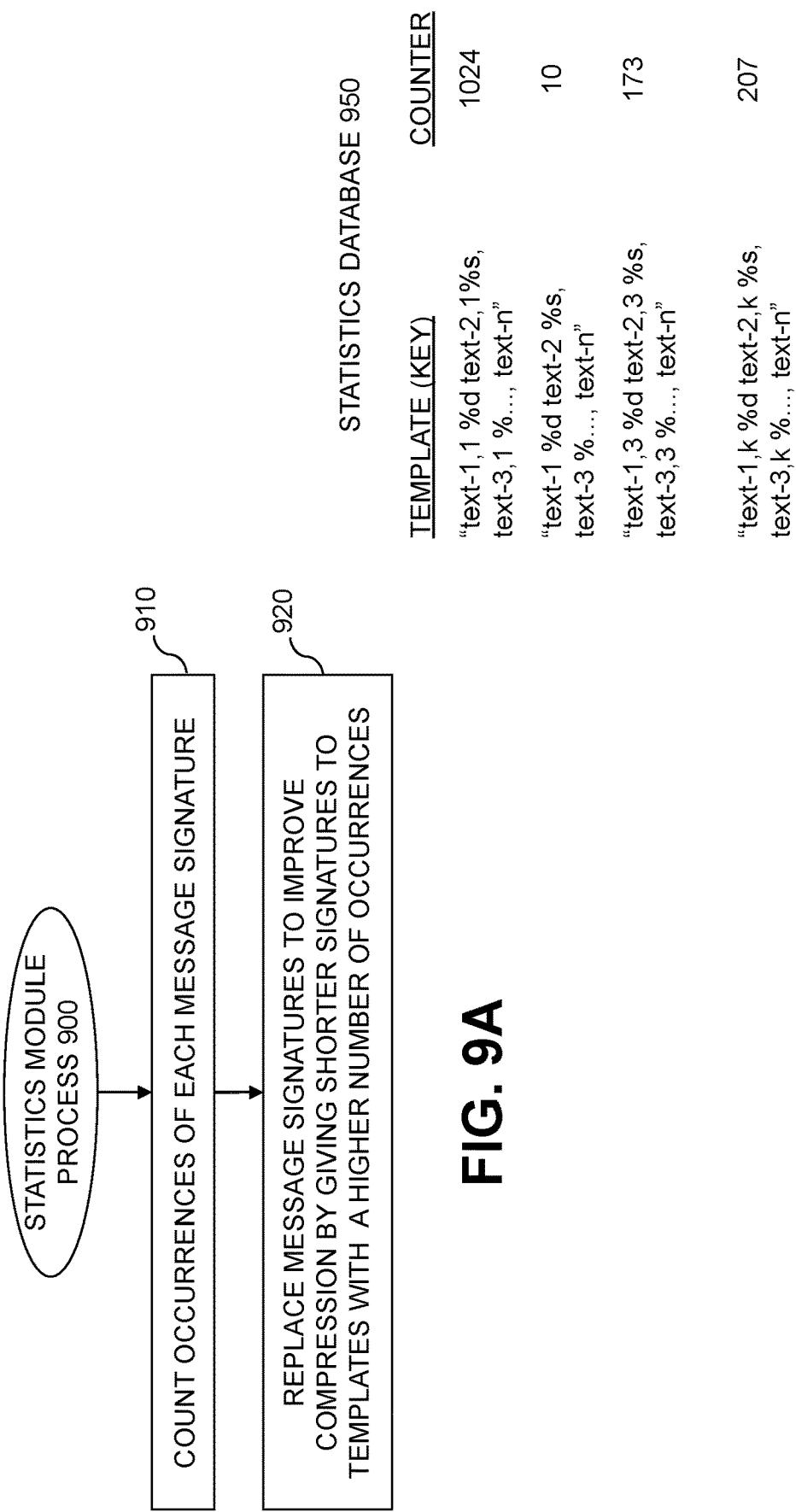
FIG. 9A is a flow chart illustrating the statistics module process of FIG. 1 in further detail, according to some embodiments.
FIG. 9B is a table illustrating an exemplary statistics database that may be used by the exemplary log message compression module of FIG. 5, according to one embodiment.

FIG. 9A is a flow chart illustrating the statistics module process 900 of FIG. 1 in further detail, according to some embodiments. Generally, the exemplary statistics module process 900 counts the occurrences of each message signature and according to the number of times each template has occurred across the log messages, relative to occurrences of other log templates, the exemplary statistics module process 900 will replace the message signatures to improve the compression by giving the template with a higher number of occurrences the signatures with the shorter lengths. The reassignment can be done, for example, from time to time using offline process that will run on the background.

As shown in FIG. 9A, the exemplary statistics module process 900 counts occurrences of each message signature during step 910 and replaces message signatures during step 920 to improve compression by giving shorter signatures to templates with a higher number of occurrences. In this manner, a given message signature is assigned to a particular message template based on a length of the given message signature and a frequency of occurrence of the particular message template.

FIG. 9B is a table illustrating an exemplary statistics database 950 that may be used by the exemplary log message compression module 500 of FIG. 5, according to one embodiment. As shown in FIG. 9B, in the exemplary statistics database 950, the keys correspond to message templates; and the values correspond to an occurrences counter (for statistics). Generally, the exemplary statistics database 950 indicates the number of occurrences of each message template.

In some embodiments, the disclosed techniques for real-time compression of log data significantly reduce storage requirements in terms of capacity and improve analysis over the log data.

Among other benefits, the disclosed log message reduction techniques parse a received log message into a message template and one or more message variables. The message variables from the log message and the message signature that corresponds to the message template of the log message in a compression index are written to a log file to store the log message in a compressed format.

One or more embodiments of the disclosure provide improved methods, apparatus and computer program products for log message reduction. The foregoing applications and associated embodiments should be considered as illustrative only, and numerous other embodiments can be configured using the techniques disclosed herein, in a wide variety of different applications.

It should also be understood that the disclosed log message reduction techniques, as described herein, can be implemented at least in part in the form of one or more software programs stored in memory and executed by a processor of a processing device such as a computer. As mentioned previously, a memory or other storage device having such program code embodied therein is an example of what is more generally referred to herein as a "computer program product."

The disclosed techniques for log message reduction may be implemented using one or more processing platforms. One or more of the processing modules or other components may therefore each run on a computer, storage device or other processing platform element. A given such element may be viewed as an example of what is more generally referred to herein as a "processing device."

As noted above, illustrative embodiments disclosed herein can provide a number of significant advantages relative to conventional arrangements. It is to be appreciated that the particular advantages described above and elsewhere herein are associated with particular illustrative embodiments and need not be present in other embodiments. Also, the particular types of information processing system features and functionality as illustrated and described herein are exemplary only, and numerous other arrangements may be used in other embodiments.

In these and other embodiments, compute services can be offered to cloud infrastructure tenants or other system users as a Platform as a Service (PaaS) offering, although numerous alternative arrangements are possible.

Some illustrative embodiments of a processing platform that may be used to implement at least a portion of an information processing system comprise cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components such as a log data compression system 100, or portions thereof, are illustratively implemented for use by tenants of such a multi-tenant environment.

Cloud infrastructure as disclosed herein can include cloud-based systems such as Amazon Web Services (AWS), Google Cloud Platform (GCP) and Microsoft Azure. Virtual machines provided in such systems can be used to implement at least portions of a log data compression platform in illustrative embodiments. The cloud-based systems can include object stores such as Amazon S3, GCP Cloud Storage, and Microsoft Azure Blob Storage.

In some embodiments, the cloud infrastructure additionally or alternatively comprises a plurality of containers implemented using container host devices. For example, a given container of cloud infrastructure illustratively comprises a Docker container or other type of Linux Container (LXC). The containers may run on virtual machines in a multi-tenant environment, although other arrangements are possible. The containers may be utilized to implement a variety of different types of functionality within the storage devices. For example, containers can be used to implement respective processing devices providing compute services of a cloud-based system. Again, containers may be used in combination with other virtualization infrastructure such as virtual machines implemented using a hypervisor.

Illustrative embodiments of processing platforms will now be described in greater detail with reference to FIGS. 10 and 11. These platforms may also be used to implement at least portions of other information processing systems in other embodiments.

Figure 10:
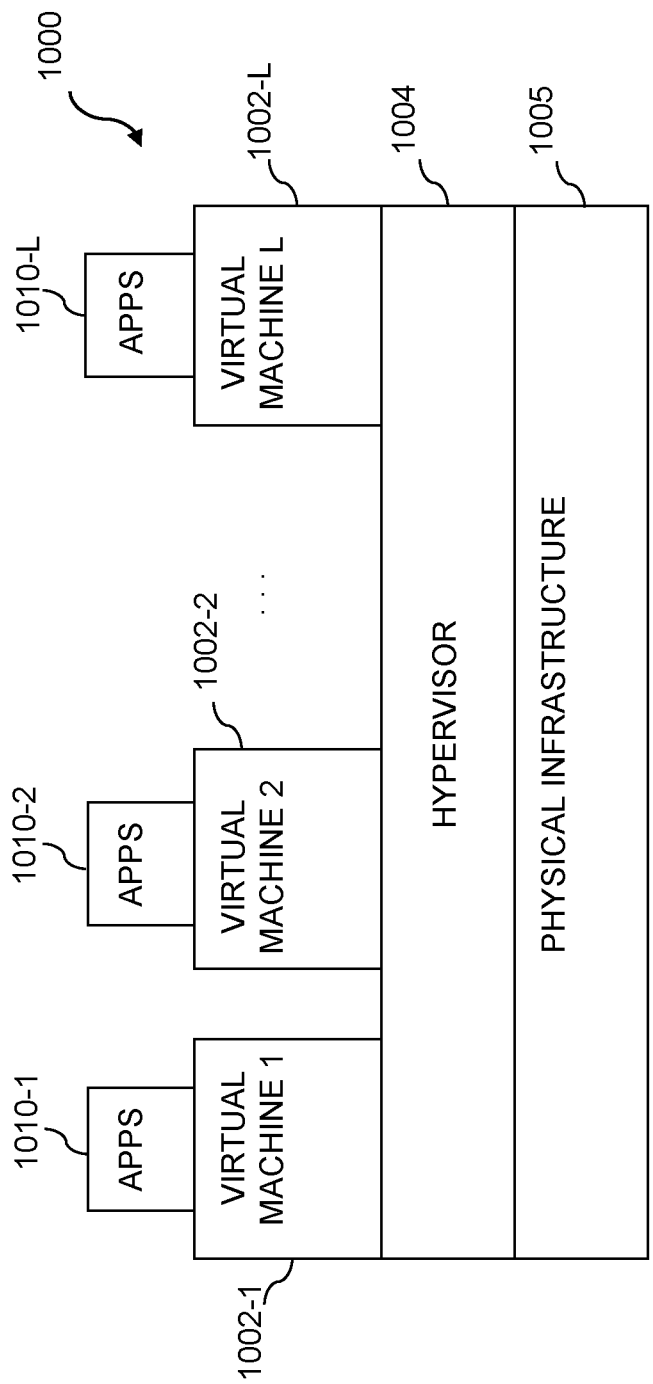
FIG. 10 illustrates an exemplary processing platform that may be used to implement at least a portion of one or more embodiments of the disclosure comprising a cloud infrastructure.

Referring now to FIG. 10, one possible processing platform that may be used to implement at least a portion of one or more embodiments of the disclosure comprises cloud infrastructure 1000. The cloud infrastructure 1000 in this exemplary processing platform comprises virtual machines (VMs) 1002-1, 1002-2, . . . 1002-L implemented using a hypervisor 1004. The hypervisor 1004 runs on physical infrastructure 1005. The cloud infrastructure 1000 further comprises sets of applications 1010-1, 1010-2, . . . 1010-L running on respective ones of the virtual machines 1002-1, 1002-2, . . . 1002-L under the control of the hypervisor 1004.

The cloud infrastructure 1000 may encompass the entire given system or only portions of that given system, such as one or more of client, servers, controllers, or computing devices in the system.

Although only a single hypervisor 1004 is shown in the embodiment of FIG. 10, the system may of course include multiple hypervisors each providing a set of virtual machines using at least one underlying physical machine. Different sets of virtual machines provided by one or more hypervisors may be utilized in configuring multiple instances of various components of the system. An example of a commercially available hypervisor platform that may be used to implement hypervisor 1004 and possibly other portions of the system in one or more embodiments of the disclosure is the VMware® vSphere™ which may have an associated virtual infrastructure management system, such as the VMware® vCenter™. As another example, portions of a given processing platform in some embodiments can comprise converged infrastructure such as VxRail™, VxRack™, VxBlock™, or Vblock® converged infrastructure commercially available from VCE, the Virtual Computing Environment Company, now the Converged Platform and Solutions Division of Dell EMC of Hopkinton, Mass. The underlying physical machines may comprise one or more distributed processing platforms that include storage products.

Particular types of storage products that can be used in implementing a given storage system of the log data compression system 100 in an illustrative embodiment include VNX® and Symmetrix VMAX® storage arrays, software-defined storage products such as ScaleIO™ and ViPR®, all-flash and hybrid flash storage arrays such as Unity™, cloud storage products such as Elastic Cloud Storage (ECS), object-based storage products such as Atmos®, scale-out all-flash storage arrays such as XtremIO™, and scale-out NAS clusters comprising Isilon® platform nodes and associated accelerators, all from Dell EMC. Combinations of multiple ones of these and other storage products can also be used in implementing a given storage system in an illustrative embodiment.

In some embodiments, the cloud infrastructure additionally or alternatively comprises a plurality of containers implemented using container host devices. For example, a given container of cloud infrastructure illustratively comprises a Docker container or other type of LXC. The containers may be associated with respective tenants of a multi-tenant environment of the system, although in other embodiments a given tenant can have multiple containers. The containers may be utilized to implement a variety of different types of functionality within the system. For example, containers can be used to implement respective compute nodes or cloud storage nodes of a cloud computing and storage system. The compute nodes or storage nodes may be associated with respective cloud tenants of a multi-tenant environment of system. Containers may be used in combination with other virtualization infrastructure such as virtual machines implemented using a hypervisor.

As is apparent from the above, one or more of the processing modules or other components of the disclosed log data compression system 100 may each run on a computer, server, storage device or other processing platform element. A given such element may be viewed as an example of what is more generally referred to herein as a "processing device." The cloud infrastructure 1000 shown in FIG. 10 may represent at least a portion of one processing platform.

Figure 11:
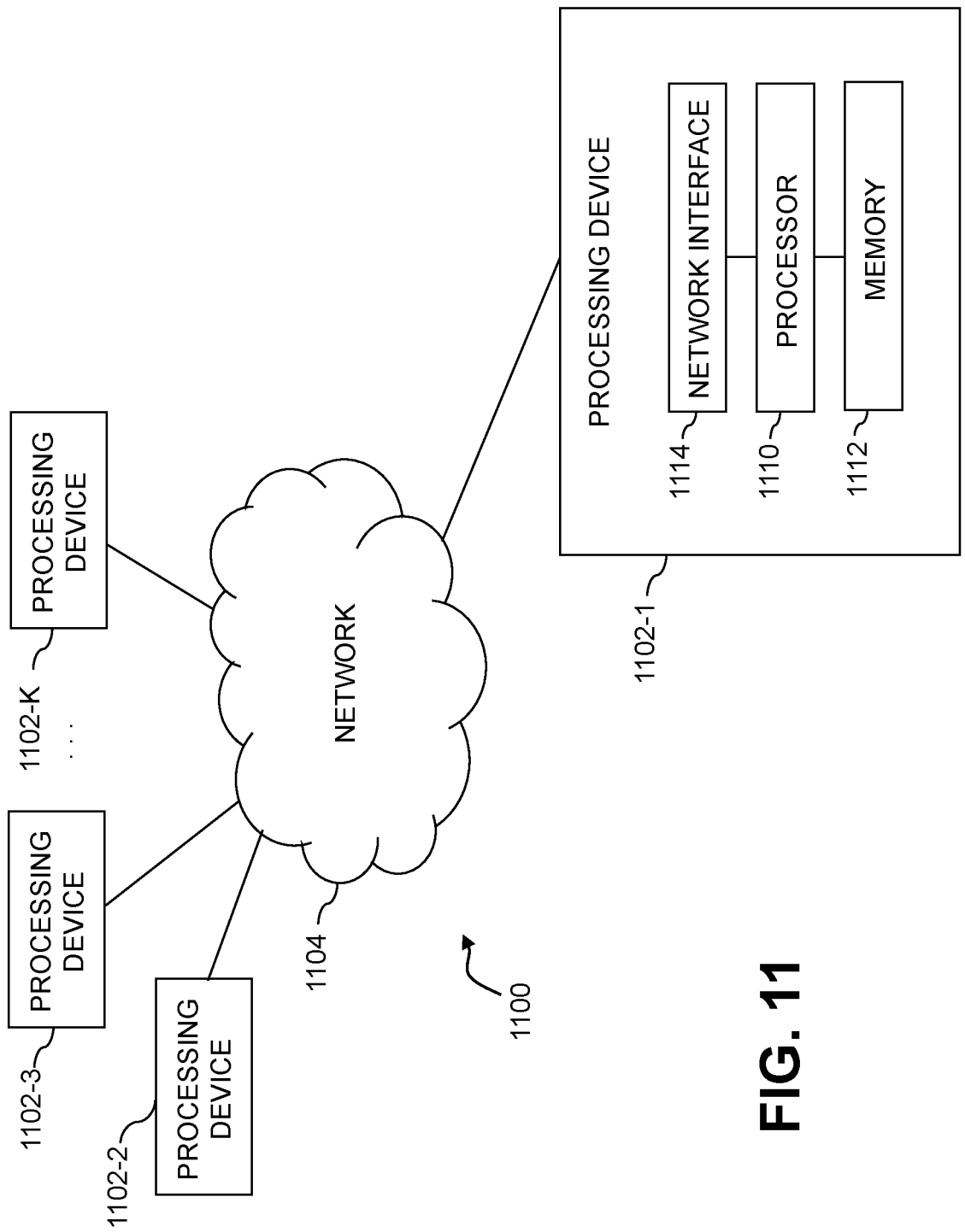
FIG. 11 illustrates another exemplary processing platform that may be used to implement at least a portion of one or more embodiments of the disclosure.

Another example of a processing platform is processing platform 1100 shown in FIG. 11. The processing platform 1100 in this embodiment comprises at least a portion of the given system and includes a plurality of processing devices, denoted 1102-1, 1102-2, 1102-3, . . . 1102-K, which communicate with one another over a network 1104. The network 1104 may comprise any type of network, such as a wireless area network (WAN), a local area network (LAN), a satellite network, a telephone or cable network, a cellular network, a wireless network such as WiFi or WiMAX, or various portions or combinations of these and other types of networks.

The processing device 1102-1 in the processing platform 1100 comprises a processor 1110 coupled to a memory 1112. The processor 1110 may comprise a microprocessor, a microcontroller, an application specific integrated circuit (ASIC), a field programmable gate array (FPGA) or other type of processing circuitry, as well as portions or combinations of such circuitry elements, and the memory 1112, which may be viewed as an example of a "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 1102-1 is network interface circuitry 1114, which is used to interface the processing device with the network 1104 and other system components, and may comprise conventional transceivers.

The other processing devices 1102 of the processing platform 1100 are assumed to be configured in a manner similar to that shown for processing device 1102-1 in the figure.

Again, the particular processing platform 1100 shown in the figure is presented by way of example only, and the given system may include additional or alternative processing platforms, as well as numerous distinct processing platforms in any combination, with each such platform comprising one or more computers, storage devices or other processing devices.

Multiple elements of system may be collectively implemented on a common processing platform of the type shown in FIG. 10 or 11, or each such element may be implemented on a separate processing platform.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure such as VxRail™, VxRack™, VxBlock™, or Vblock® converged infrastructure commercially available from VCE, the Virtual Computing Environment Company, now the Converged Platform and Solutions Division of Dell EMC.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in the information processing system. Such components can communicate with other elements of the information processing system over any type of network or other communication media.

As indicated previously, components of an information processing system as disclosed herein can be implemented at least in part in the form of one or more software programs stored in memory and executed by a processor of a processing device. For example, at least portions of the functionality shown in one or more of the figures are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A method, comprising:
   obtaining at least one log message of a plurality of log messages, wherein the at least one log message comprises a message template and one or more message variable values, wherein the message template is repeated across the plurality of the log messages and comprises at least one portion that is replaced with at least one of the message variable values;
   obtaining a compression index that maps each of a plurality of different message templates to a corresponding message signature of a plurality of message signatures, wherein a given message signature is assigned to a particular message template based on a length of the given message signature and a frequency of occurrence of the particular message template;
   initializing a counter associated with the message template in response to the message template not being in the compression index and incrementing the counter associated with the message template in response to the message template being in the compression index;
   adding the message template and the corresponding message signature to the compression index;
   obtaining the corresponding message signature from the compression index that corresponds to the message template in the at least one log message;
   writing, using at least one processing device, the one or more message variable values and the message signature corresponding to the message template of the at least one log message to a log file; and
   reassigning one or more of the message signatures based at least in part on a number of occurrences of each message signature and a number of times each message template has occurred across a plurality of the log messages, relative to occurrences of other message templates, using the counter.

2. The method of claim 1, further comprising the step of determining whether the message template is in the compression index.

3. The method of claim 2, further comprising, when a given message template is not in the compression index, adding a message signature to a decompression index for the given message template.

4. The method of claim 1, wherein the compression index comprises a key/value database where the plurality of message templates are keys and the corresponding message signatures are values of the key/value database.

5. The method of claim 1, further comprising the step of decompressing the log file using a decompression index that maps a plurality of message signatures to corresponding message templates.

6. The method of claim 5, wherein the decompression index comprises a key/value database where the message signatures are keys and the corresponding plurality of message templates are values of the key/value database.

7. The method of claim 1, wherein the message template is not stored in the log file.

8. A system, comprising:
   a memory; and
   at least one processing device, coupled to the memory, operative to implement the following steps:
   obtaining at least one log message of a plurality of log messages, wherein the at least one log message comprises a message template and one or more message variable values, wherein the message template is repeated across the plurality of the log messages and comprises at least one portion that is replaced with at least one of the message variable values;
   obtaining a compression index that maps each of a plurality of different message templates to a corresponding message signature of a plurality of message signatures, wherein a given message signature is assigned to a particular message template based on a length of the given message signature and a frequency of occurrence of the particular message template;
   initializing a counter associated with the message template in response to the message template not being in the compression index and incrementing the counter associated with the message template in response to the message template being in the compression index;
   adding the message template and the corresponding message signature to the compression index;
   obtaining the corresponding message signature from the compression index that corresponds to the message template in the at least one log message;

writing, using at least one processing device, the one or more message variable values and the message signature corresponding to the message template of the at least one log message to a log file; and reassigning one or more of the message signatures based at least in part on a number of occurrences of each message signature and a number of times each message template has occurred across a plurality of the log messages, relative to occurrences of other message templates, using the counter.

9. The system of claim 8, further comprising, when a given message template is not in the compression index, adding a message signature to a decompression index for the given message template.

10. The system of claim 8, wherein the compression index comprises a key/value database where the plurality of message templates are keys and the corresponding message signatures are values of the key/value database.

11. The system of claim 8, further comprising the step of decompressing the log file using a decompression index that maps a plurality of message signatures to corresponding message templates.

12. The system of claim 8, wherein the message template is not stored in the log file.

13. A computer program product, comprising a non-transitory machine-readable storage medium having encoded therein executable code of one or more software programs, wherein the one or more software programs when executed by at least one processing device perform the following steps:

obtaining at least one log message of a plurality of log messages, wherein the at least one log message comprises a message template and one or more message variable values, wherein the message template is repeated across the plurality of the log messages and comprises at least one portion that is replaced with at least one of the message variable values;

obtaining a compression index that maps each of a plurality of different message templates to a corresponding message signature of a plurality of message signatures, wherein a given message signature is assigned to a particular message template based on a length of the given message signature and a frequency of occurrence of the particular message template;

initializing a counter associated with the message template in response to the message template not being in the compression index and incrementing the counter associated with the message template in response to the message template being in the compression index;

adding the message template and the corresponding message signature to the compression index;

obtaining the corresponding message signature from the compression index that corresponds to the message template in the at least one log message;

writing, using at least one processing device, the one or more message variable values and the message signature corresponding to the message template of the at least one log message to a log file; and reassigning one or more of the message signatures based at least in part on a number of occurrences of each message signature and a number of times each message template has occurred across a plurality of the log messages, relative to occurrences of other message templates, using the counter.

14. The computer program product of claim 13, further comprising, when a given message template is not in the compression index, adding a message signature to a decompression index for the given message template.

15. The computer program product of claim 13, wherein the compression index comprises a key/value database where the plurality of message templates are keys and the corresponding message signatures are values of the key/value database.

16. The computer program product of claim 13, further comprising the step of decompressing the log file using a decompression index that maps a plurality of message signatures to corresponding message templates.

17. The computer program product of claim 13, wherein the message template is not stored in the log file.

18. The method of claim 1, wherein the reassigning is performed using an offline process.

19. The system of claim 8, wherein the reassigning is performed using an offline process.

20. The computer program product of claim 13, wherein the reassigning is performed using an offline process.

* * * * *